(12) United States Patent
Gray et al.

(10) Patent No.: US 8,104,185 B2
(45) Date of Patent: Jan. 31, 2012

(54) LIGHTWEIGHT WHEEL CLAMP FOR VEHICLE WHEEL ALIGNMENT SYSTEM

(75) Inventors: Brian K. Gray, Conway, AR (US); David A. Jackson, Point Roberts, WA (US); Ronald D. Swayne, Sherwood, AR (US)

(73) Assignee: Snap-On Incorporated, Kenosha, WI (US)

( * ) Notice: Subject to any disclaimer, the term of this patent is extended or adjusted under 35 U.S.C. 154(b) by 0 days.

(21) Appl. No.: 12/881,824

(22) Filed: Sep. 14, 2010

(65) Prior Publication Data

US 2011/0146089 A1    Jun. 23, 2011

Related U.S. Application Data

(60) Provisional application No. 61/282,115, filed on Dec. 18, 2009.

(51) Int. Cl.
*G01B 5/255* (2006.01)
(52) U.S. Cl. ...................................... 33/203.18
(58) Field of Classification Search .............. 33/203.18, 33/288; 248/229.1; 269/216
See application file for complete search history.

(56) References Cited

U.S. PATENT DOCUMENTS

| | | | |
|---|---|---|---|
| 2,475,502 A | 7/1949 | Holmes | |
| 3,101,641 A | 8/1963 | Walker et al. | |
| 3,709,451 A * | 1/1973 | Graham | 33/203.18 |
| 3,758,958 A * | 9/1973 | Jordan | 33/203.18 |
| 3,805,396 A | 4/1974 | Hunnicutt | |
| 3,990,666 A | 11/1976 | Morrison et al. | |
| 4,095,902 A | 6/1978 | Florer et al. | |
| 4,167,817 A | 9/1979 | Hunter | |
| 4,285,136 A | 8/1981 | Ragan | |
| 4,337,581 A * | 7/1982 | Eck | 33/288 |
| 4,363,175 A | 12/1982 | Hedahl | |
| 4,377,038 A | 3/1983 | Ragan | |
| 5,056,231 A | 10/1991 | Alusick et al. | |
| 5,535,522 A | 7/1996 | Jackson | |
| 5,724,743 A | 3/1998 | Jackson | |

(Continued)

FOREIGN PATENT DOCUMENTS

DE    203 19 147 U1    4/2004

(Continued)

OTHER PUBLICATIONS

International Search Report and Written Opinion of the International searching Authority, issued in International Patent Application No. PCT/US2010/04877, mailed Nov. 4, 2010.

*Primary Examiner* — G. Bradley Bennett
(74) *Attorney, Agent, or Firm* — McDermott Will & Emery LLP

(57) ABSTRACT

A lightweight wheel clamp assembly is provided for attaching to a vehicle wheel for performing a wheel alignment on the vehicle. The assembly comprises a first bracket for engaging the vehicle wheel; a second bracket for engaging the vehicle wheel; a handle rotatably mounted to the second bracket; and a rod having a threaded portion and an attachment portion near a first end of the rod. The first bracket is attachable to the attachment portion of the rod, and the handle is threaded to engage the threaded portion of the rod, such that when a user grasps and rotates the handle, a distance between the first and second brackets can be adjusted to rigidly attach the wheel clamp assembly to the vehicle wheel.

45 Claims, 18 Drawing Sheets

U.S. PATENT DOCUMENTS

| | | | |
|---|---|---|---|
| 5,809,658 A | 9/1998 | Jackson et al. | |
| 5,943,783 A | 8/1999 | Jackson | |
| 6,148,528 A | 11/2000 | Jackson | |
| 6,237,234 B1 | 5/2001 | Jackson et al. | |
| 6,313,911 B1 | 11/2001 | Stieff | |
| 6,343,568 B1 | 2/2002 | Mclasky | |
| 6,483,577 B2 | 11/2002 | Stieff | |
| 6,532,062 B2 | 3/2003 | Jackson et al. | |
| 6,560,883 B2 | 5/2003 | Jackson et al. | |
| 6,661,505 B2 | 12/2003 | Jackson et al. | |
| 6,698,962 B2 | 3/2004 | Wang | |
| 6,718,646 B2 * | 4/2004 | Corghi | 33/203.18 |
| 6,823,601 B2 | 11/2004 | Murray | |
| 6,957,795 B1 | 10/2005 | Hsieh | |
| 7,089,776 B2 | 8/2006 | Dale, Jr. | |
| 7,121,011 B2 | 10/2006 | Murray et al. | |
| RE40,214 E * | 4/2008 | Pellegrino | 33/203.18 |
| 2002/0170195 A1 * | 11/2002 | Corghi | 33/203.18 |
| 2004/0035898 A1 | 2/2004 | Gilstrap | |
| 2004/0139620 A1 | 7/2004 | Stopa | |
| 2005/0082730 A1 | 4/2005 | Murray et al. | |
| 2008/0209744 A1 * | 9/2008 | Stieff et al. | 33/203.18 |

FOREIGN PATENT DOCUMENTS

| | | |
|---|---|---|
| GB | 612699 | 11/1948 |

* cited by examiner

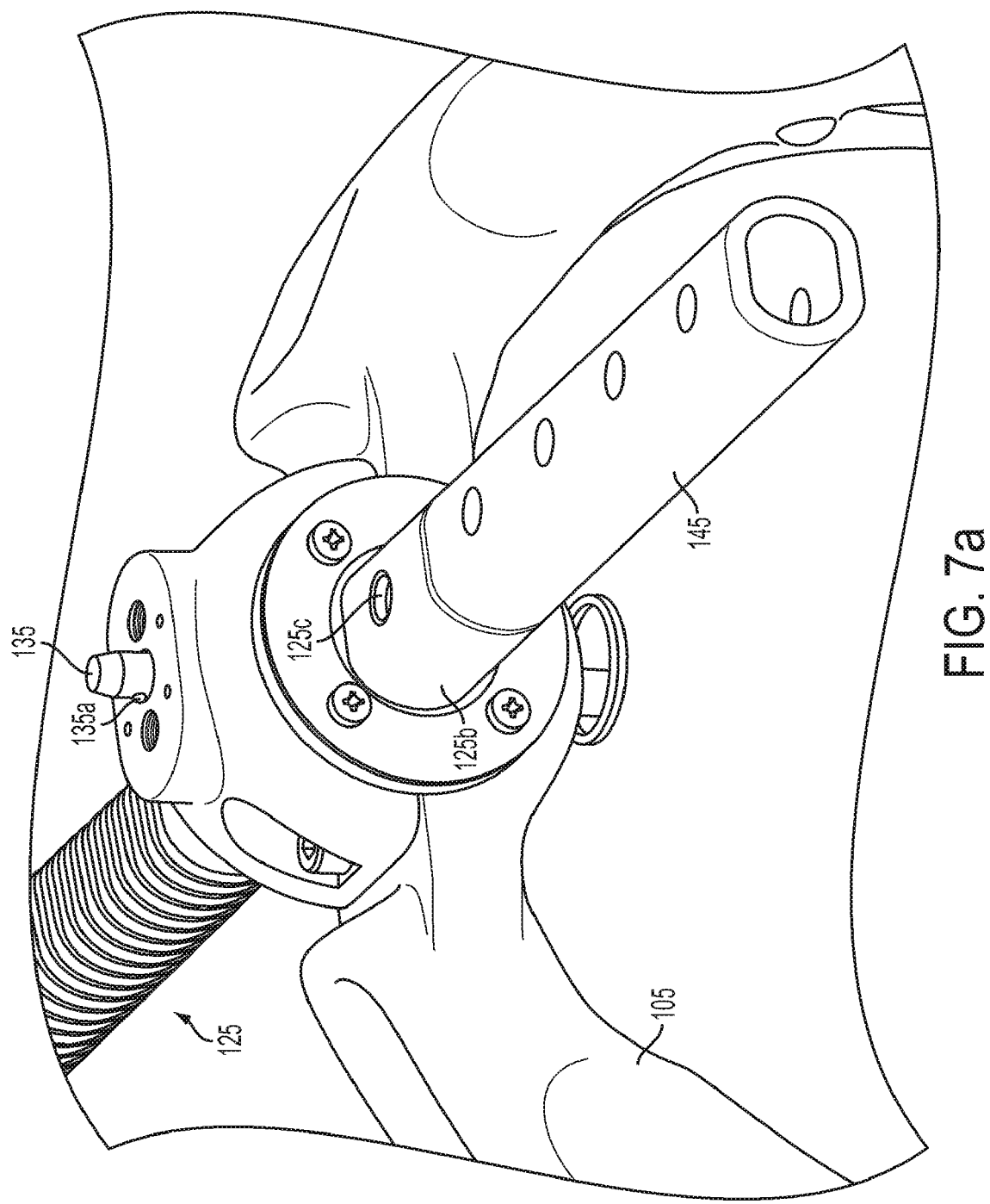

LIGHTWEIGHT WHEEL CLAMP FOR VEHICLE WHEEL ALIGNMENT SYSTEM

RELATED APPLICATION

The present invention claims priority of provisional patent application No. 61/282,115 filed Dec. 18, 2009, the contents of which are incorporated herein in their entirety.

TECHNICAL FIELD

The present subject matter relates to wheel alignment equipment for vehicles. The present subject matter has particular applicability to wheel clamps for attaching alignment elements to vehicle wheels.

BACKGROUND ART

Certain current conventional vehicle wheel alignment systems use alignment elements referred to as "alignment heads" that are attached to the wheels of a vehicle to measure various angles of the wheels and suspension. These angles are communicated to a host system, where they are used in the calculation of vehicle alignment angles. In the standard conventional aligner configuration, four alignment heads are attached to respective wheels of a vehicle. Each alignment head comprises two horizontal or toe measurement sensors and two vertical or camber/pitch sensors. Each alignment head also contains electronics to support overall sensor data acquisition as well as communications with the aligner console, local user input, and local display for status feedback, diagnostics and calibration support. Other conventional alignment systems, referred to as "visual aligners", use optical targets attached to each vehicle wheel instead of sensors. The targets are imaged by cameras, and these visual images are used to calculate the vehicle wheel alignment angles.

Such alignment equipment usually includes a wheel clamp that attaches to a vehicle's wheel and carries the alignment element (i.e., the sensor equipment that measures the alignment angles of the vehicle, or the optical target). Referring now to FIG. 1, a conventional wheel clamp 1100 includes upper and lower sliding brackets 1105, 1110, respectively, for engaging the rim of the vehicle wheel, and a center bracket 1115 for holding an alignment element. Brackets 1105, 1110, 1115 are all slidably mounted on a pair of guide bars 1120, 1125. A lead screw 1130 threadingly engages upper and lower brackets 1105, 1110 for clamping the clamp 1100 to the vehicle wheel. The vehicle being aligned is usually positioned on a vehicle alignment lift at heights from three to four feet for performing alignments. The vehicle is usually raised even higher, up to six feet, for servicing the vehicle from underneath.

There exists a need to lower the weight of alignment equipment, such as wheel clamp 100, that an alignment technician attaches to a vehicle's wheel. Lower weight reduces the amount of kinetic energy (i.e., shock loading) that is imparted to this equipment in case it falls off a wheel to which it is attached, thereby reducing the chance of damaging the equipment. Lower weight has the added benefit of reducing strain and fatigue on the technician lifting and holding this equipment up until it can be attached to a vehicle's wheel. A typical four-wheel alignment requires the technician perform such a lifting/holding operation for each of the four wheels of the vehicle, and this operation may be performed several times a day in a typical alignment shop.

There also exists a need to quickly move the attachment brackets from a small diameter rim/wheel to a larger diameter rim/wheel, or vice versa. Conventional methods require the alignment technician to turn a knob multiple times to move the attachment brackets in or out, which can take a significant amount of time, and is tiring for the technician.

SUMMARY

The teachings herein improve over conventional alignment equipment by reducing the weight of the equipment and allowing the equipment to be adjusted quickly and easily, while simplifying the equipment, thereby reducing costs.

According to the present disclosure, the foregoing and other advantages are achieved in part by a wheel clamp assembly for attaching to a vehicle wheel for performing a wheel alignment on the vehicle. The assembly comprises a first bracket for engaging the vehicle wheel; a second bracket for engaging the vehicle wheel; a handle rotatably mounted to the second bracket; and a rod having a threaded portion, and an attachment portion proximal a first end of the rod. The first bracket is attachable to the attachment portion of the rod, and the handle is threadingly engagable with the threaded portion of the rod, such that when a user grasps and rotates the handle, a distance between the first and second brackets can be adjusted to rigidly attach the wheel clamp assembly to the vehicle wheel.

In accord with another aspect of the disclosure, a wheel clamp assembly is provided for attaching to a vehicle wheel for performing a wheel alignment on the vehicle. The assembly comprises a first bracket for engaging the vehicle wheel; a second bracket for engaging the vehicle wheel; a handle mounted to the second bracket; a threaded shaft having a first threaded portion threaded in a first direction, and a second threaded portion threaded in a second direction opposite the first direction; and a handwheel fixedly attached to an end of the shaft. The first bracket is threadingly engaged with the first threaded portion of the shaft, and the handle is threadingly engaged with the second threaded portion of the shaft, such that when a user rotates the handwheel while preventing the handle from rotating, a distance between the first and second brackets can be adjusted to rigidly attach the wheel clamp assembly to the vehicle wheel.

In accord with yet another aspect of the disclosure, a wheel clamp assembly for attaching to a vehicle wheel for performing a wheel alignment on the vehicle comprises a first bracket for engaging the vehicle wheel; a second bracket for engaging the vehicle wheel; and a rod. The first bracket is fixedly attachable to the rod, and the second bracket is slidably movable on the rod, and includes a lock for fixedly attaching the second bracket to a selected position on the rod for adjusting a distance between the first and second brackets to rigidly attach the wheel clamp assembly to the vehicle wheel.

Additional advantages and novel features will be set forth in part in the description which follows and in part will become apparent to those having ordinary skill in the art upon examination of the following and the accompanying drawings or may be learned from production or operation of the examples. The advantages of the present teachings may be realized and attained by practice or use of the methodologies, instrumentalities and combinations particularly pointed out in the appended claims.

BRIEF DESCRIPTION OF THE DRAWINGS

Reference is made to the attached drawings, wherein elements having the same reference numeral designations represent like elements throughout, and wherein:

FIGS. 7a-d show a rod extension arrangement for the wheel clamp assembly of FIG. 2.

DETAILED DESCRIPTION

Figure 1:
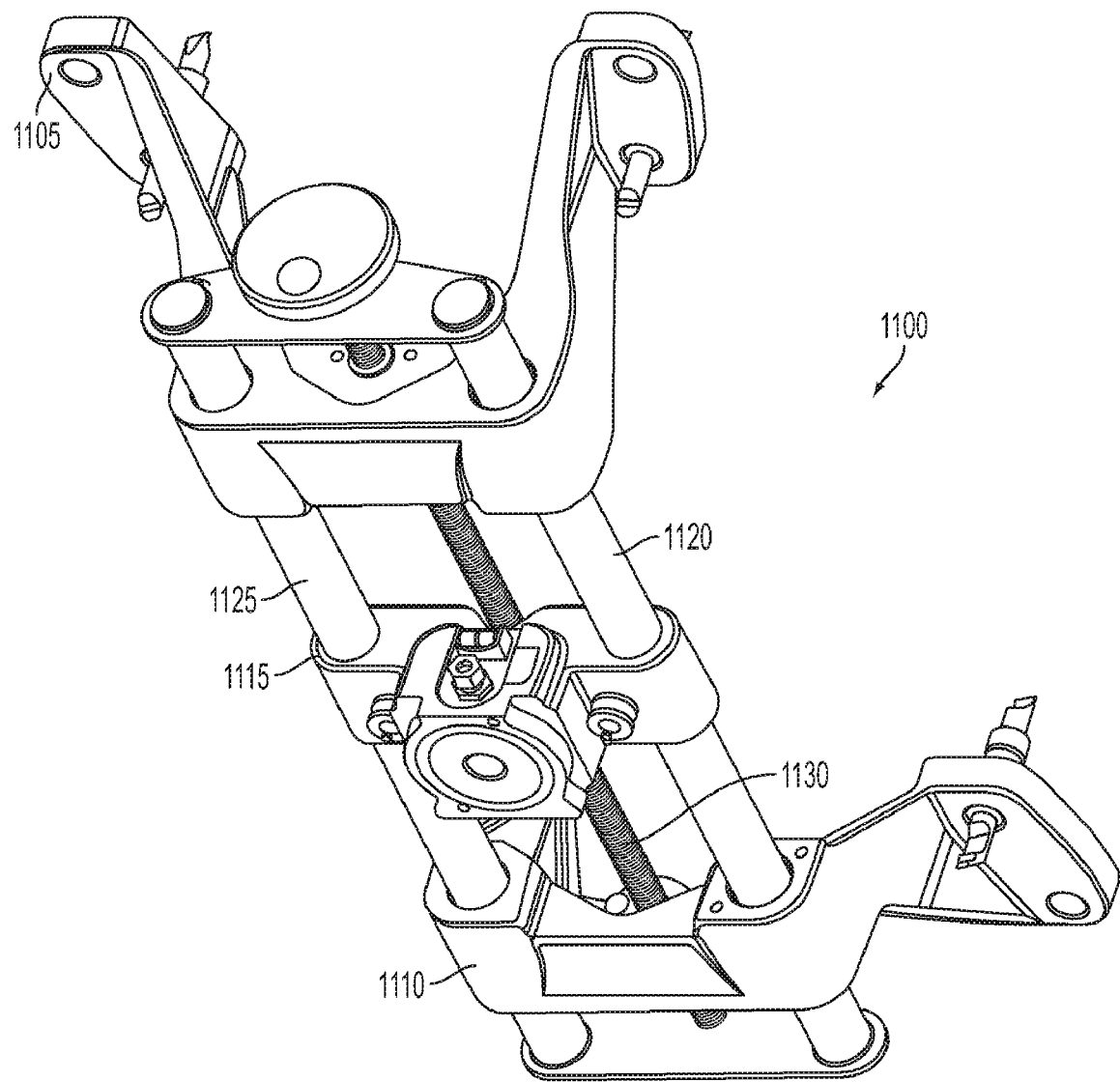
FIG. 1 illustrates a conventional wheel clamp.
Figure 2:
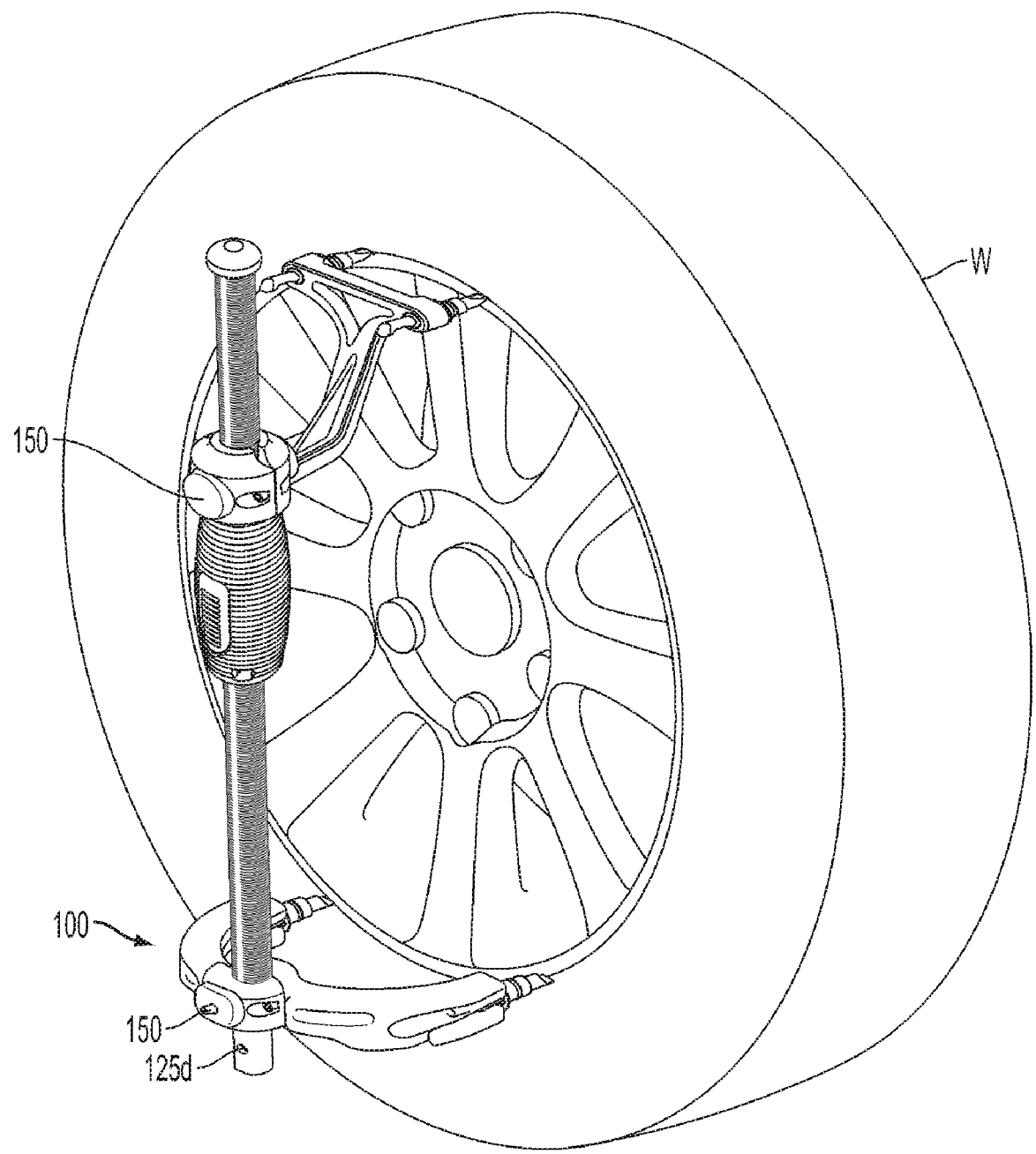
FIG. 2 shows an embodiment of the disclosed lightweight wheel clamp assembly attached to a vehicle wheel.
Figure 3:
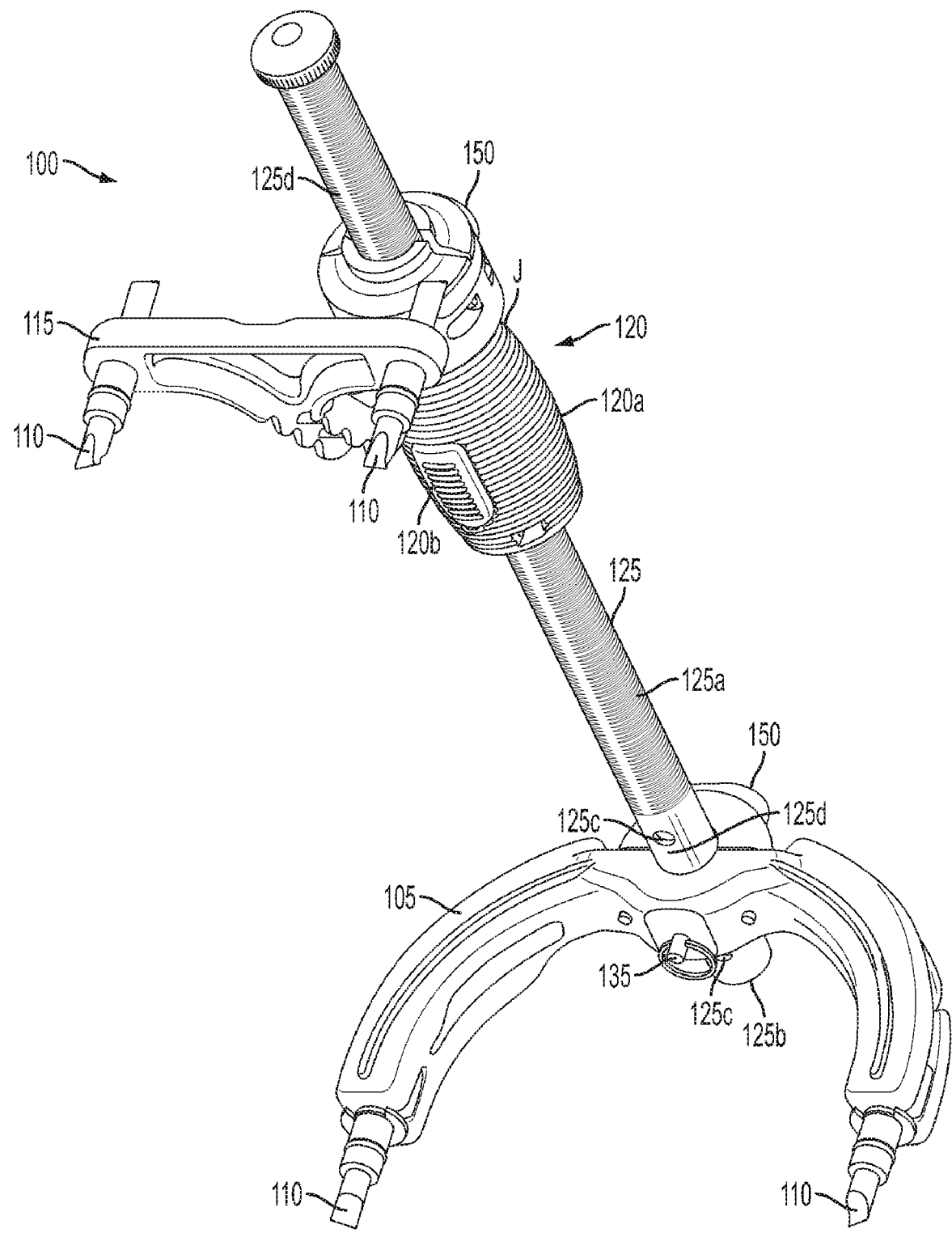
FIG. 3 is another view of the wheel clamp assembly of FIG. 2.

Several examples of wheel clamp assemblies according to the present disclosure will now be described with reference to the drawings. As shown in FIGS. 2 and 3, a wheel clamp assembly 100 is for attaching to a vehicle wheel W for performing a wheel alignment on the vehicle. Wheel clamp assembly 100 has a first bracket 105 for engaging the vehicle wheel W via two grabbers 110, and a second bracket 115 for engaging the vehicle wheel W via another two grabbers 110 (see FIG. 2). A handle 120 is rotatably mounted to the second bracket 115 at a joint J, and the handle 120 is threadingly engagable with a threaded portion 125a of a rod 125. The rod 125 is made from a lightweight material such as aluminum. The first bracket 105 is attachable to an attachment portion 125b proximal a first end of the rod 125. When a user grasps and rotates the handle 120, a distance between the first and second brackets can be adjusted to rigidly attach the wheel clamp assembly 100 to the vehicle wheel W.

In this embodiment, the rod 125 has at least one outer peripheral facet 125d, and the second bracket 115 has a corresponding through-hole for slidably engaging the rod's outer peripheral facet(s) 125d such that when the user grasps and rotates the handle 120 to adjust the distance between the first and second brackets 105, 115, the second bracket 115 does not substantially rotate relative to the rod 125. The facet 125d is shown in the drawings as a flat portion of the rod 125, but those skilled in the art will understand that the facet can be any shape that accomplishes the anti-rotation function. For example, the facet can be a groove in the periphery of the rod. Of course, the first bracket would then need to include a corresponding protrusion that fits into the groove.

Figure 4:
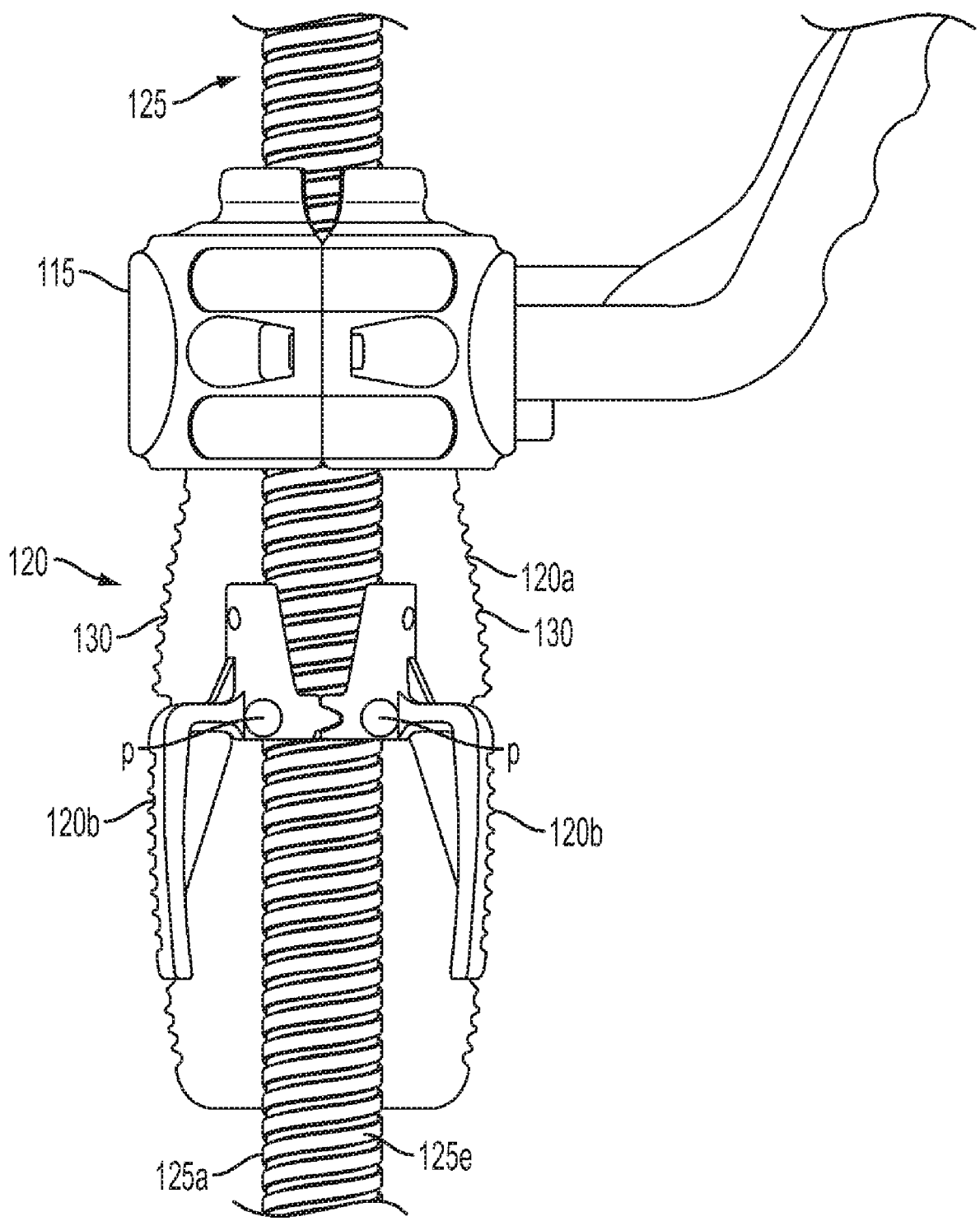
FIGS. 4 and 5 are cross-sectional views of the handle of the wheel clamp assembly of FIG. 2.
Figure 5:
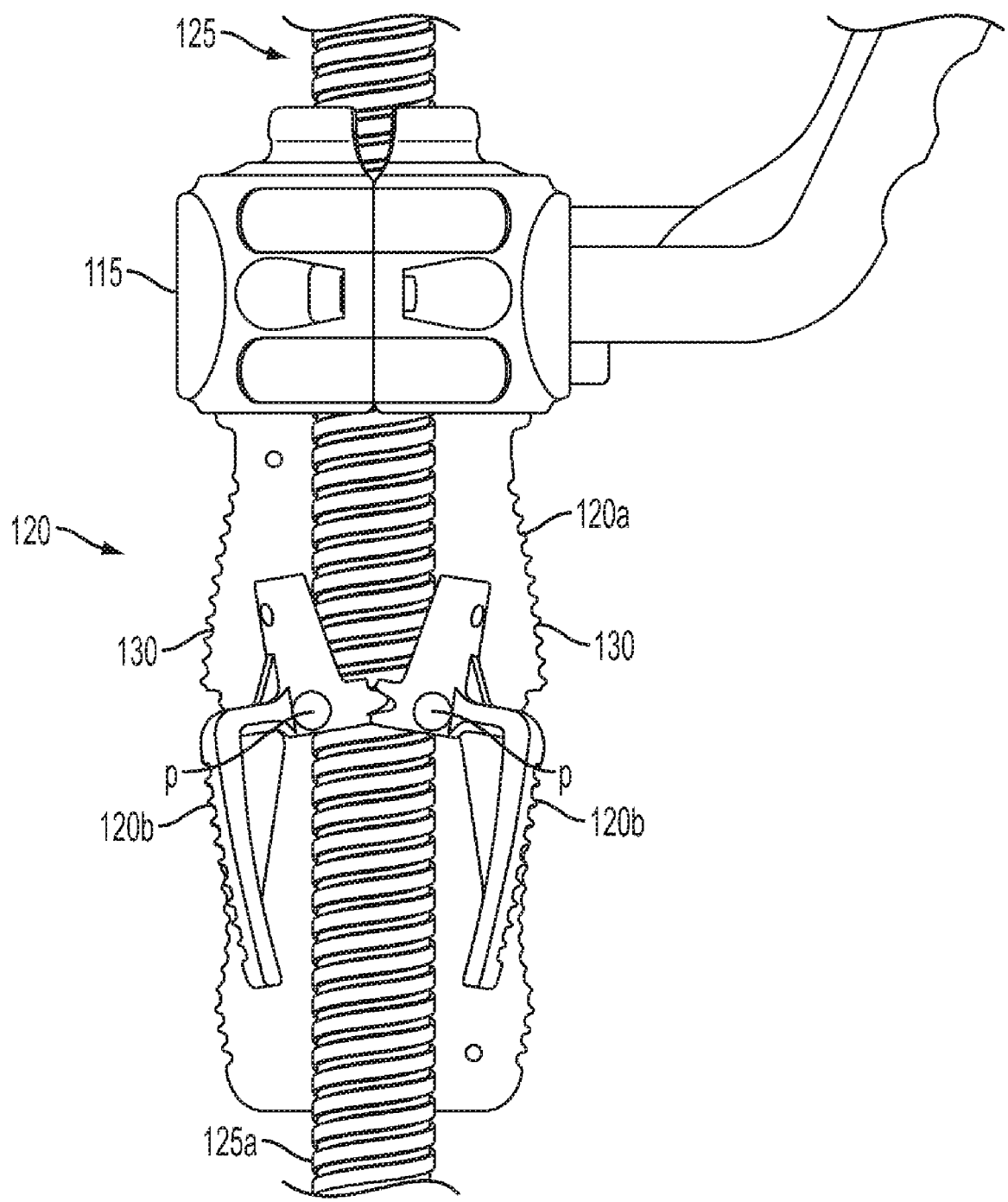

Referring now to FIGS. 3-5, the handle 120 comprises a handle body 120a and a pair of jaws 120b movably mounted to the handle body 120a and threadingly engagable with opposing sides of the threaded portion 125a of the rod 125. The jaws 120b are made of a strong material such as steel. The jaws 120b are movable by the user from a first position where they are threadingly engaged with the threaded portion 125a of the rod 125, as shown in FIG. 4, to a second position where they are not threadingly engaged with the rod 125, as shown in FIG. 5. More specifically, as shown in FIGS. 4 and 5, the jaws 120b are pivotably mounted to the handle body 120 at respective pivot points P such that they are pivotable from the first position to the second position by the user, and a spring 130 is mounted between the handle body 120a and each of the jaws 120b to bias each jaw 120b to the first position.

When the jaws 120b are in the first position and the user grasps and rotates the handle body 120a, the distance between the first and second brackets 105, 115 can be adjusted to rigidly attach the wheel clamp assembly 100 to the vehicle wheel W, and when the jaws 120b are in the second position, the second bracket 115 and handle 120 are slidably movable relative to the rod 125.

In the embodiment shown in FIGS. 2-5, the jaws 120 and the springs 130 are for moving the jaws 120 from the first position to the second position when a predetermined tension is exerted on the threaded portion 125a of the rod 125 when user grasps and rotates the handle 120. This automatic torque limiting feature prevents over-tightening of the clamp assembly that would damage the threads of the rod 125. This feature is especially advantageous when the rod 125 comprises a lightweight metal such as aluminum, and the jaws 120 are steel. Referring now to FIG. 4, the torque limiting feature is accomplished, for example, by providing the threaded portion 125a of rode 125 with variable pitch, flat top "acme threads" (i.e., conventional power transmission threads) 125e. Acme threads allow slippage, and the springs 130 and pivot points P are chosen to allow the jaws 120 to pop free of the threads 125e at a predetermined thread tension, to prevent over-tightening and damage to the threads 125e.

Figure 6:
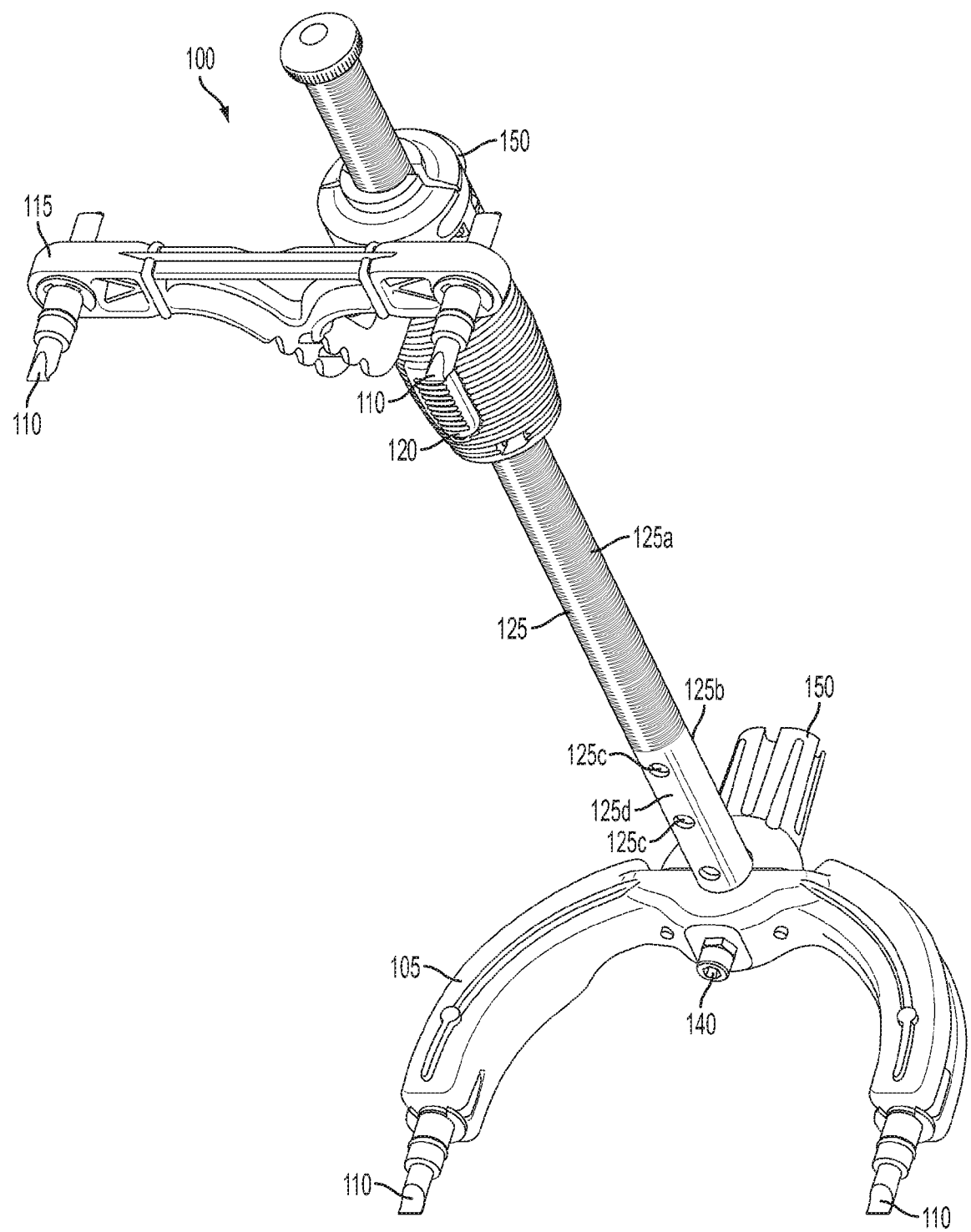
FIG. 6 shows an alternative embodiment of the wheel clamp assembly of FIG. 2.
Figure 7B:
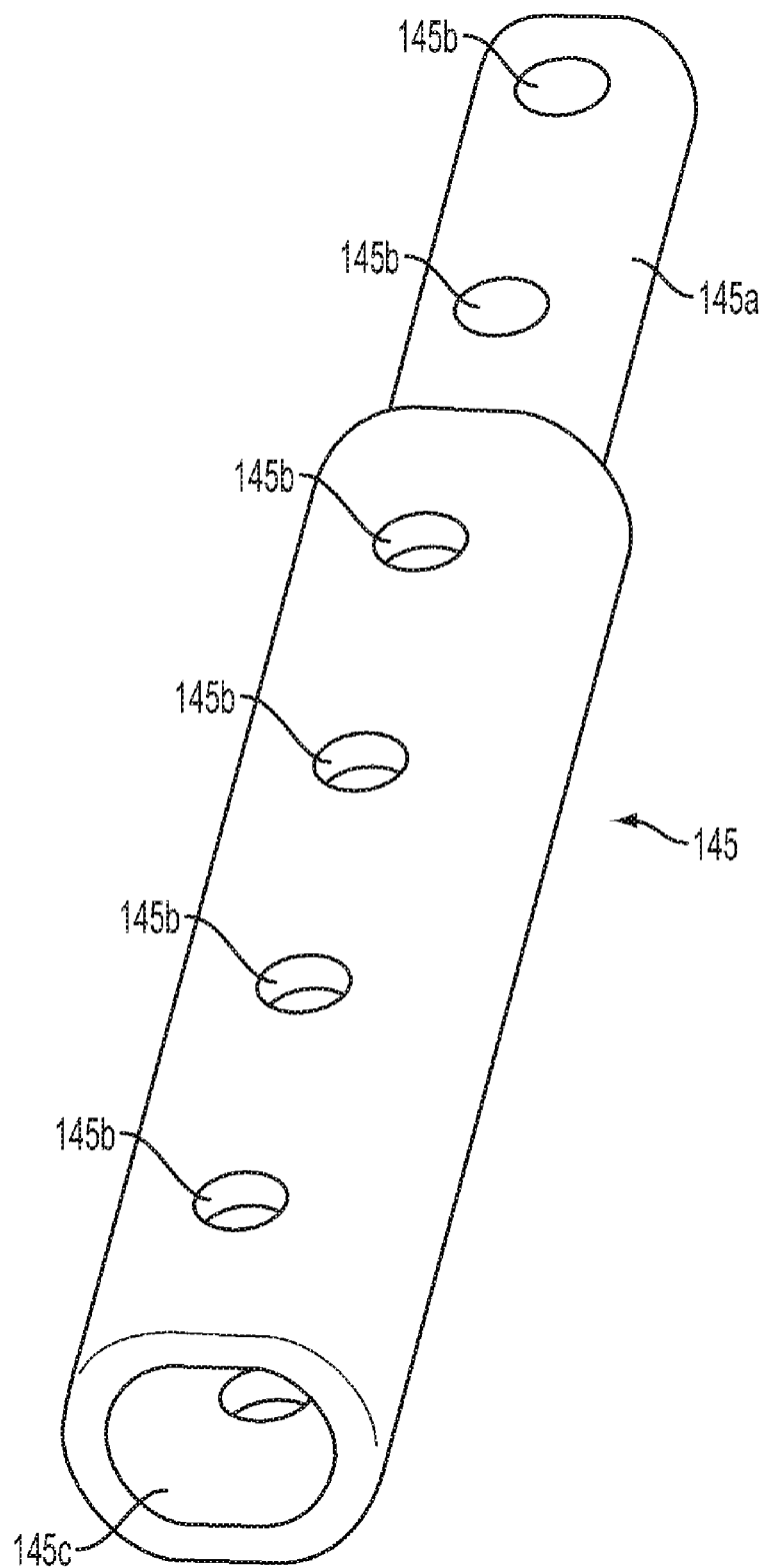

The first bracket 105 is adjustably and pivotally mounted to the attachment portion 125b of the rod 125. As shown in FIGS. 3 and 6, the attachment portion 125b of the rod 125 has a plurality of transverse holes 125c spaced from one another, the first bracket 105 has a corresponding through-hole, and the first bracket 105 is attachable to the attachment portion 125b via a fastener extending through the through-hole and engagable with any one of the transverse holes 125c. In one embodiment shown in FIGS. 3 and 7a, the fastener is a pin 135 having a ball detent 135a for engaging the first bracket 105 to retain the pin 135 in the transverse hole 125c. In a further embodiment shown in FIG. 6, the transverse holes 125c are threaded, and the fastener is a bolt 140 that is threadingly engaged with one of the transverse threaded holes. The pivot mounting of first bracket 105 enables it to move a small amount relative to rod 125 for easier mounting of clamp assembly 100 to wheel W.

Figure 7C:
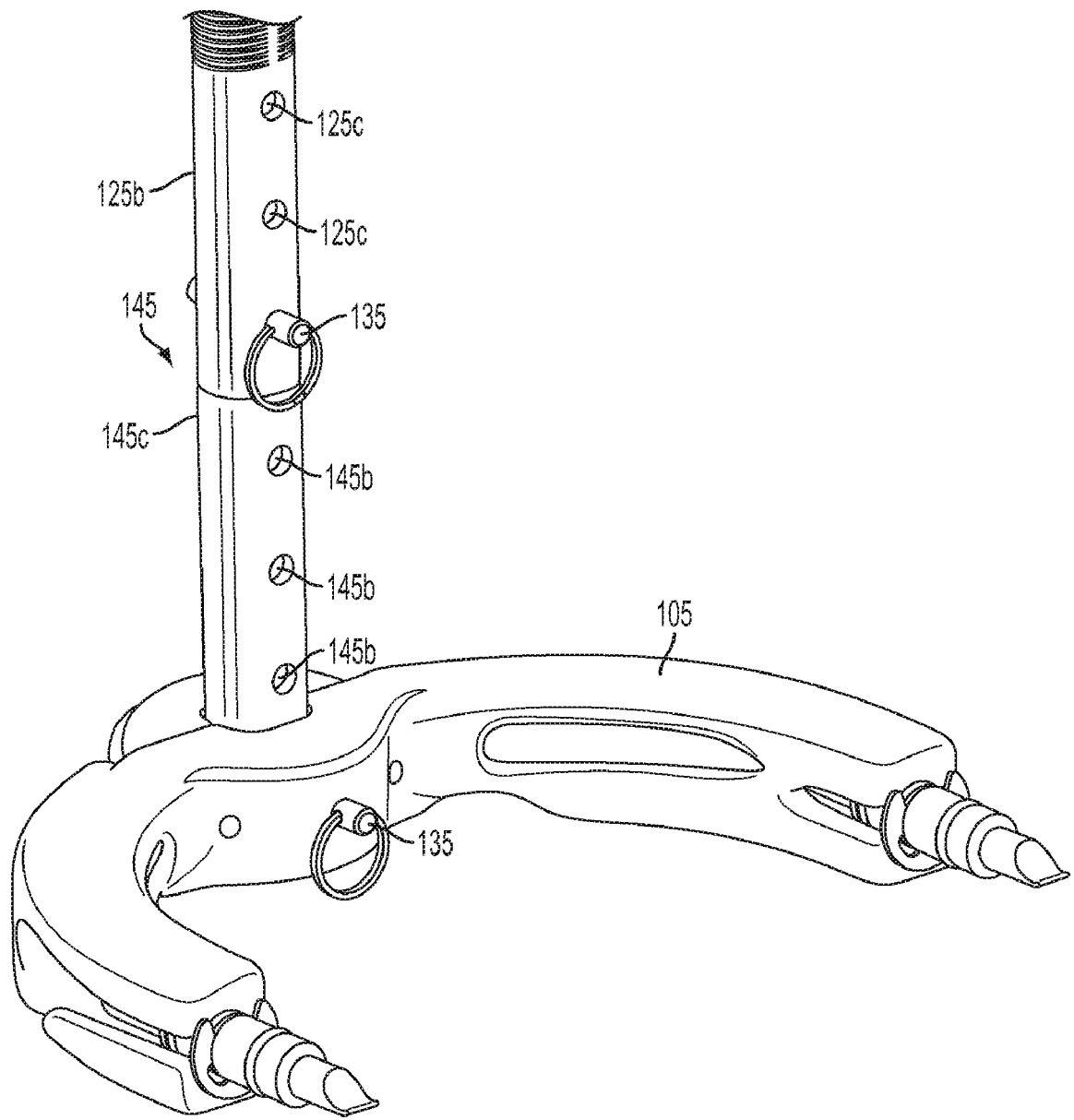
Figure 7D:
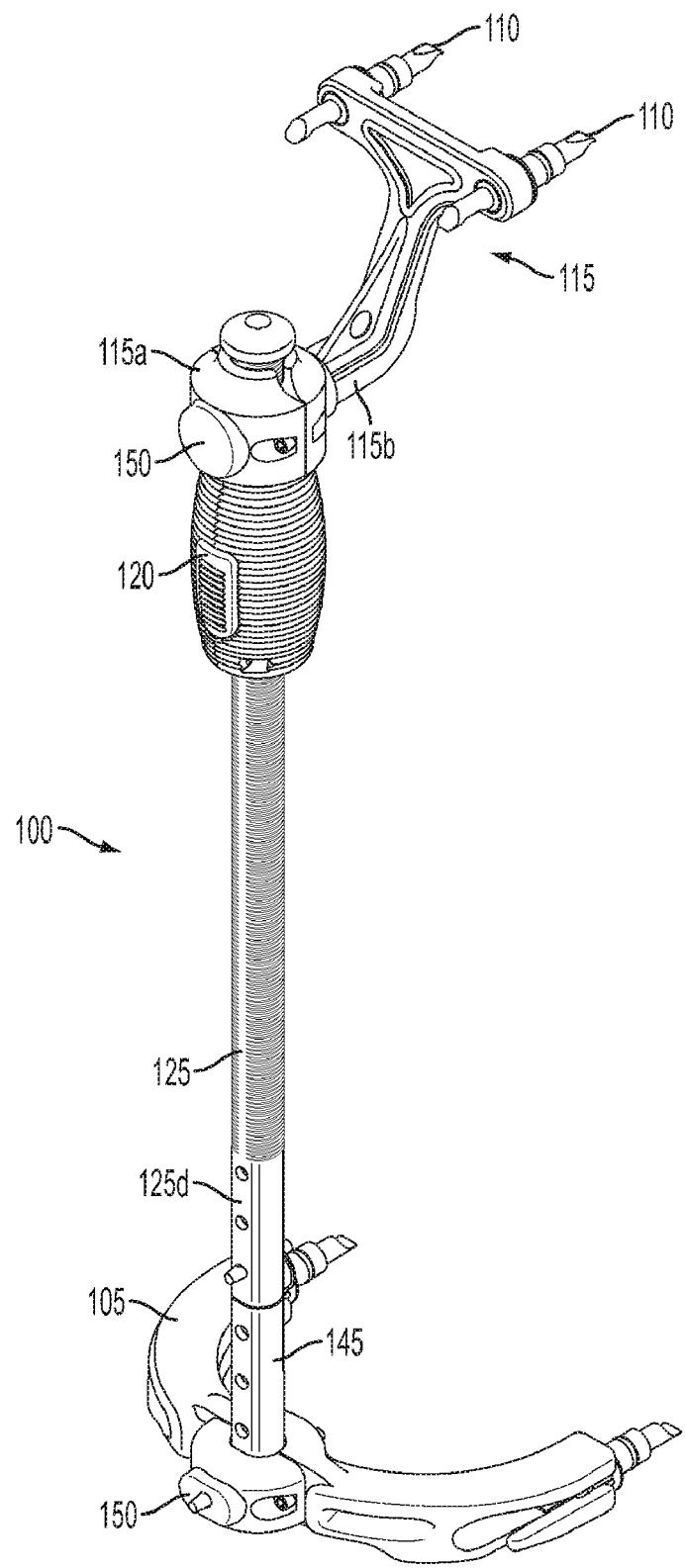

In certain embodiments of the disclosed assembly shown in FIGS. 7a-d, the first end of the rod 125 has a hollow portion, and a rod extension 145 is provided to increase the length of rod 125, to enable the disclosed clamp assembly to be used on larger-diameter vehicle wheels (see FIG. 7d). Rod extension 145 has a stepped first end 145a, which is an attachment portion attachable to the attachment portion 125c of the rod 125, and transverse holes 145b for securing the rod extension 145 to the rod 125 and for attaching the first bracket 105 to the rod extension 145 (e.g., via pins 135 as shown in FIG. 7c). The rod extension 145 also has a hollow connection portion 145c at a second end opposite its first end 145a for attaching a second rod extension 145 to further extend the length of the rod 125.

As shown in FIGS. 2-7d and FIG. 10, the first bracket 105 has a measuring device mounting location 150 for adjustably mounting a wheel alignment element 180 to the first bracket 105. In certain embodiments, the second bracket 115 also has a measuring device mounting location 150 for adjustably mounting a wheel alignment element to the second bracket 115.

A useful feature of the disclosed wheel clamp assembly is that the second bracket/handle unit is "reversible;" that is, it can be threaded onto the rod handle-first or bracket-first, as necessary to accommodate different sizes of wheels. As shown in FIG. 7d, the second bracket 115 comprises a hub 115a, an arm 115b extending outward from the hub 115a, and at least one grabber 110 at a distal end of the arm 115b for engaging the vehicle wheel. The arm 115b extends from the hub 115a such that the grabber(s) 110 are offset from the hub 115a along an axial direction of the rod 125. The second bracket 115 and the handle 120 are threadable onto the rod 125 so that the handle 120 is between the first and second brackets 105, 115 (as shown in FIG. 7d); and the second bracket 115 and the handle 120 are also threadable onto the rod 125 so that the second bracket 115 is between the first bracket 105 and the handle 120.

Figure 8:
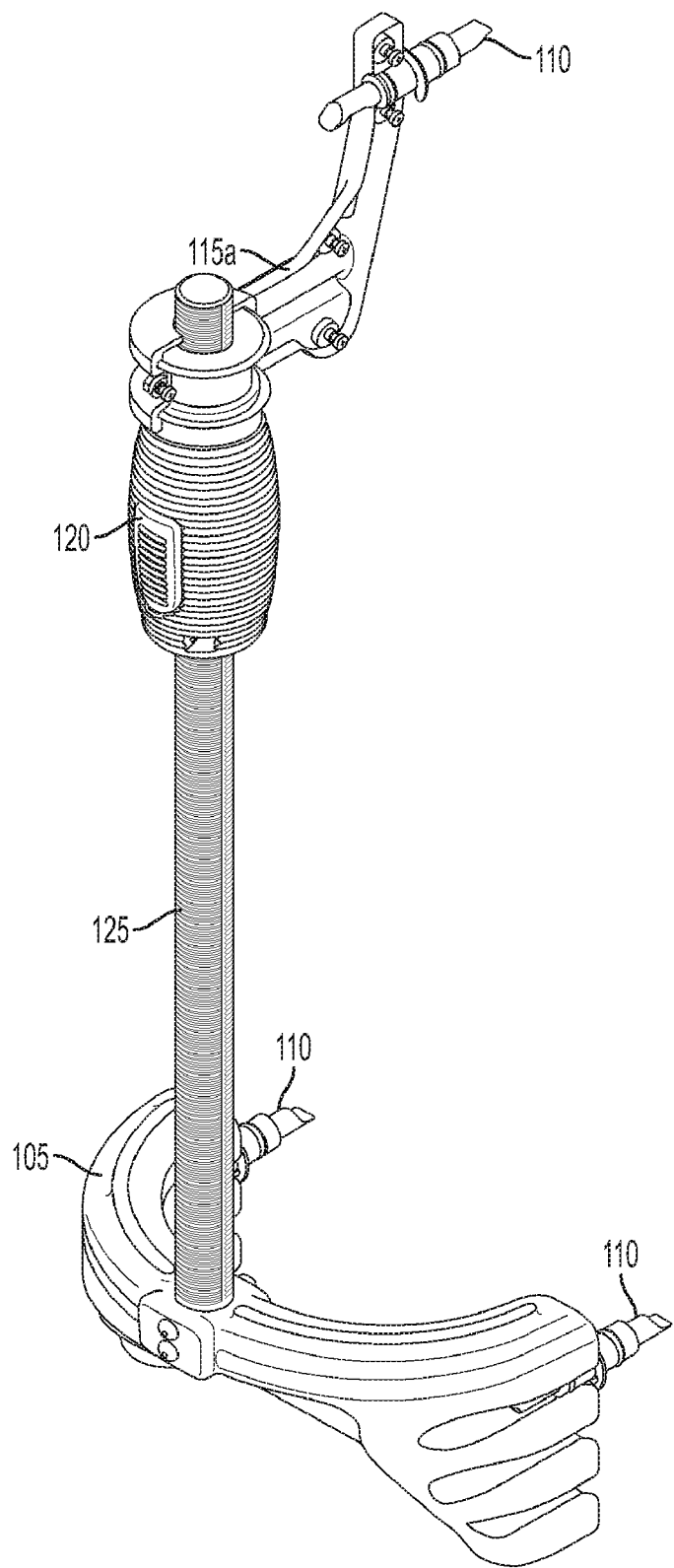
FIGS. 8 and 9 show alternative embodiment of the second bracket of the wheel clamp assembly of FIG. 2.

In a further embodiment shown in FIG. 8, the first bracket 105 comprises two grabbers 110 for engaging the vehicle wheel, and a second bracket 115a comprises exactly one grabber 110 for engaging a vehicle wheel. The three grabbers 110 of the first and second brackets cooperate to rigidly attach the wheel clamp assembly to the vehicle wheel when the distance between the first and second brackets is adjusted via the handle 120, as described above.

Figure 9:
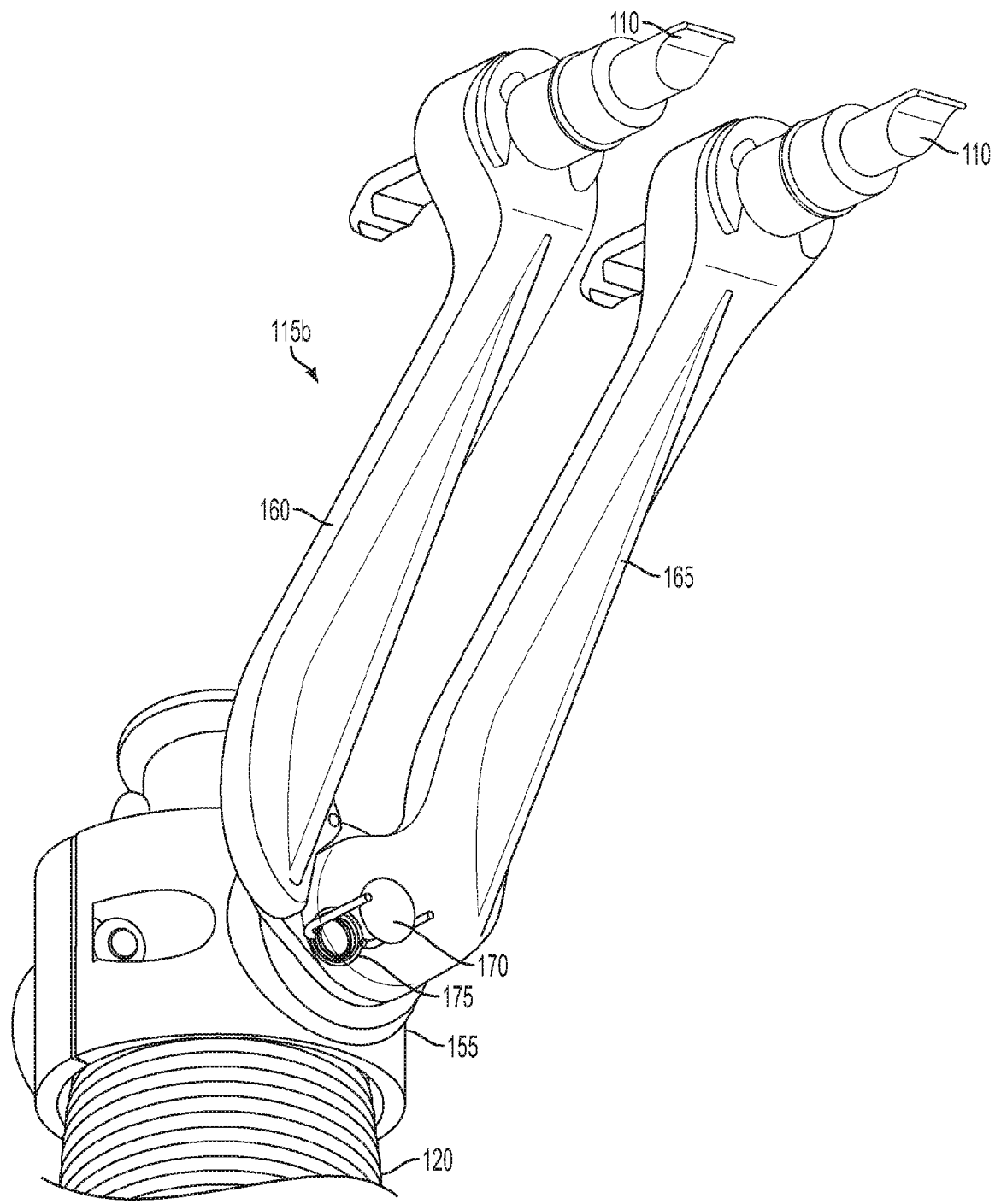

In a still further embodiment shown in FIG. 9, the second bracket 115b comprises a central hub 155 and a pair of arms 160, 165 pivotally mounted to the hub 155 via a common pivot point 170, each of the arms having a grabber 110 for engaging a vehicle wheel, and a spring, such as a coil spring 175 attached to both arms 160, 165, for biasing the arms towards each other. When the distance between the first and second brackets 105, 115b is adjusted so the grabbers 110 of the first and second brackets engage the vehicle wheel, the second bracket arms 160, 165 move away from each other as the distance between the first and second brackets 105, 115b is thereafter reduced, until the wheel clamp assembly 100 is rigidly attached to the vehicle wheel W.

Figure 10:
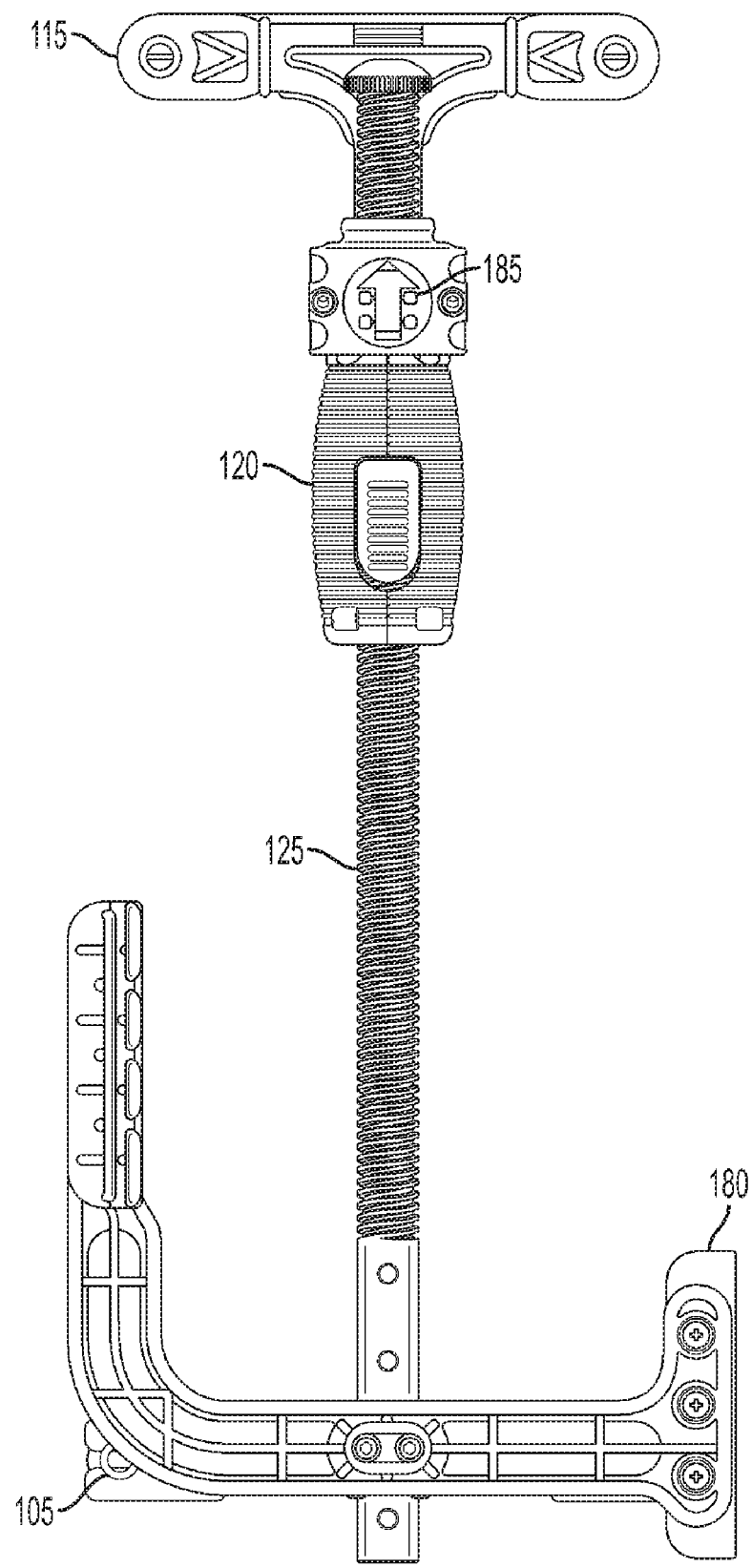
FIG. 10 shows various details of the wheel clamp assembly of FIG. 2.

In an embodiment of the disclosed clamp assembly shown in FIG. 10, a marking 185 is provided on the second bracket 115 for enabling a camera vision system (not shown) to find the location of the second bracket 115. Marking 185 can be a unique symbol to readily identify the particular wheel to which the wheel clamp assembly should be attached, for correct usage.

Figure 11:
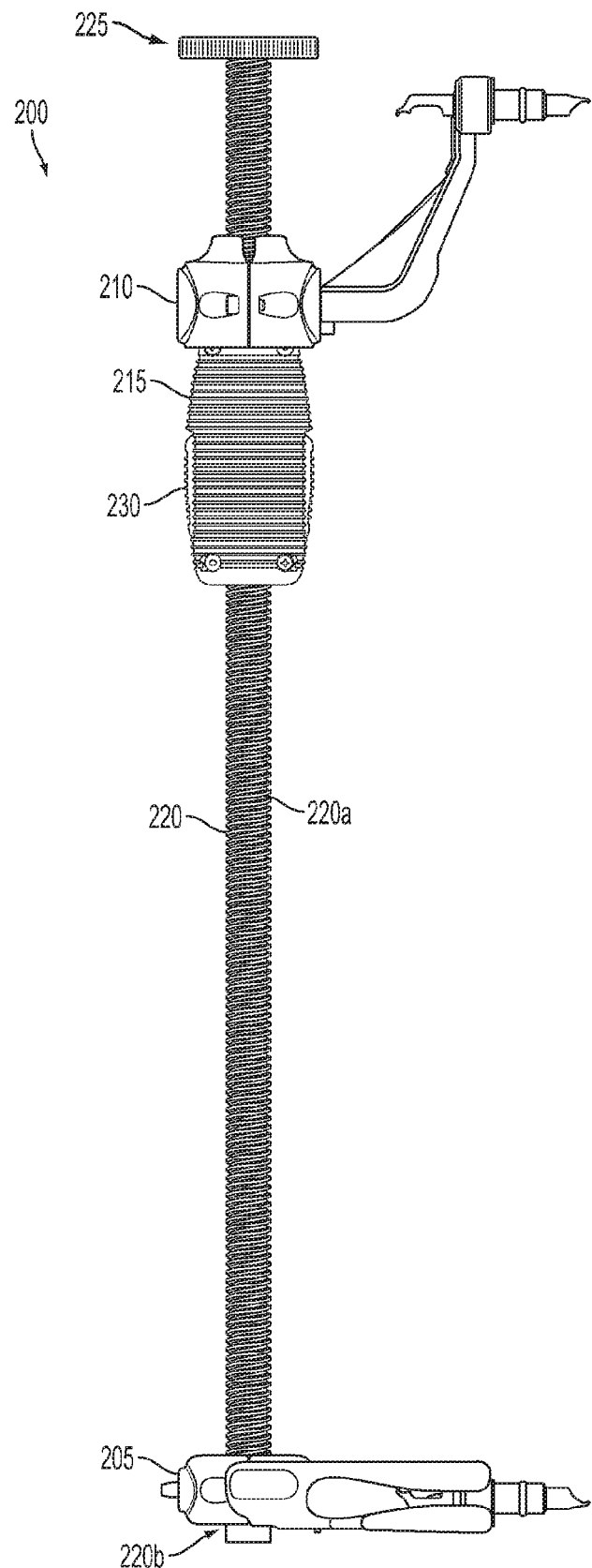
FIG. 11 shows an alternative embodiment of a wheel clamp assembly according to the present disclosure.

In a further embodiment of the disclosed wheel clamp assembly shown in FIG. 11, a wheel clamp assembly 200 includes a first bracket 205 for engaging the vehicle wheel; a second bracket 210 for engaging the vehicle wheel; a handle rotatably 215 mounted to the second bracket 210; and a rod 220 having a threaded portion 220a and an attachment portion 220b proximal a first end of the rod 220. The first bracket 205 is rotatably mounted to the attachment portion 220b of the rod 220, and a handwheel 225 is fixedly mounted at a second end of the rod 220. The handle 215 is threadingly engagable with the threaded portion 220a of the rod 220, such that when a user grasps and rotates the handle 215, a distance between the first and second brackets 205, 215 can be adjusted to rigidly attach the wheel clamp assembly 200 to the vehicle wheel. Likewise, when a user grasps and rotates the handwheel 225, a distance between the first and second brackets 205, 215 can be adjusted to rigidly attach the wheel clamp assembly 200 to the vehicle wheel.

The wheel clamp assembly 200 is identical to the above-described clamp assembly 100 of FIGS. 3-5 in all respects except for the addition of the handwheel 225, and the fact that the first bracket 205 is rotatably mounted to rod attachment portion 220b. Thus, clamp assembly 200 has jaws 230 in its handle 215 identical to the jaws 120b of the clamp assembly 100. Consequently, when the jaws 230 are in the first position and the user rotates the handwheel 225 while preventing the handle 215 from rotating, the distance between the first and second brackets 205, 210 can be adjusted.

Figure 12:
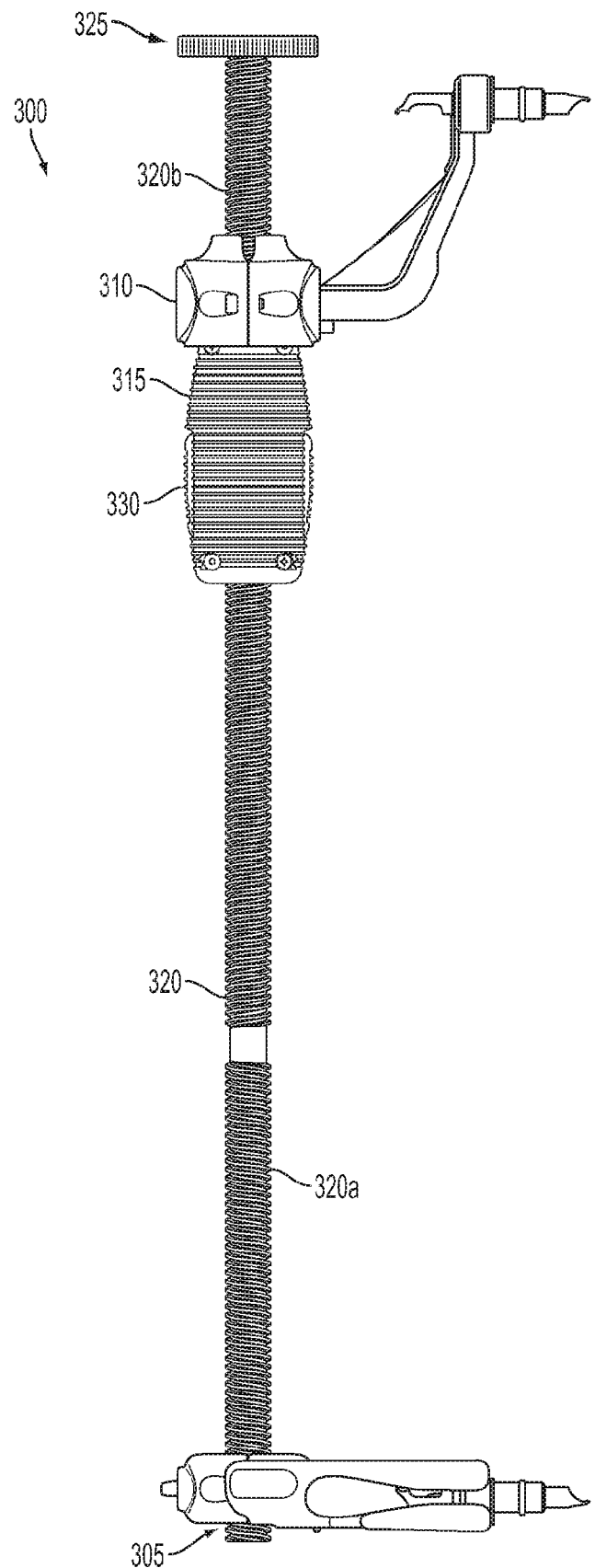
FIG. 12 shows an alternative embodiment of a wheel clamp assembly according to the present disclosure.

In a further embodiment of the disclosed wheel clamp assembly shown in FIG. 12, the assembly 300 comprises a first bracket 305 for engaging the vehicle wheel; a second bracket 310 for engaging the vehicle wheel; a handle 315 rotatably mounted to the second bracket 310; a threaded shaft 320 having a first threaded portion 320a threaded in a first direction, and a second threaded portion 320b threaded in a second direction opposite the first direction; and a handwheel 325 fixedly attached to an end of the shaft. The first bracket 305 is threadingly engaged with the first threaded portion 320a of the shaft 320, and the handle 315 is threadingly engaged with the second threaded portion 320b of the shaft 320, such that when a user rotates the handwheel 325 while preventing the handle 315 from rotating, a distance between the first and second brackets 305, 310 can be quickly adjusted to rigidly attach the wheel clamp assembly 300 to the vehicle wheel.

In a related embodiment, the shaft is threaded in a single direction, and the first bracket and handle are oppositely threaded, to produce the same effect as the embodiment described immediately above. In other words, the threaded portions 320a, 320b of shaft 320 are threaded in the same direction, the first bracket 305 is threaded in a first direction, and the handle 315 is threaded in a second direction opposite the first direction. The first bracket 305 and the handle 315 are threadingly engaged with the shaft 320, such that when a user rotates the handwheel 325 while preventing the handle 315 from rotating, a distance between the first and second brackets 305, 310 can be quickly adjusted to rigidly attach the wheel clamp assembly 300 to the vehicle wheel. The embodiments of FIG. 11 are otherwise identical.

Clamp assembly 300 has jaws 330 in its handle 315 identical to the jaws 120b of the clamp assembly 100, whose details are shown in FIGS. 4 and 5 and described herein above. Consequently, when the jaws 330 are in the first position and the user rotates the handwheel 325 while preventing the handle 315 from rotating, the distance between the first and second brackets 305, 310 can be adjusted to rigidly attach the wheel clamp assembly 300 to the vehicle wheel, and when the jaws 330 are in the second position, the second bracket 310 and handle 315 are slidably movable relative to the rod 320. Also, the jaws 330 provide the automatic torque limiting feature described herein above with reference to FIGS. 4 and 5.

It should be understood that the clamp assembly 300 can also include various features described herein above with reference to the clamp assembly 100, such as the measuring device mounting locations 150 on the first and/or second brackets 305, 310, and the marking 185 shown in FIG. 10.

Figure 13A:
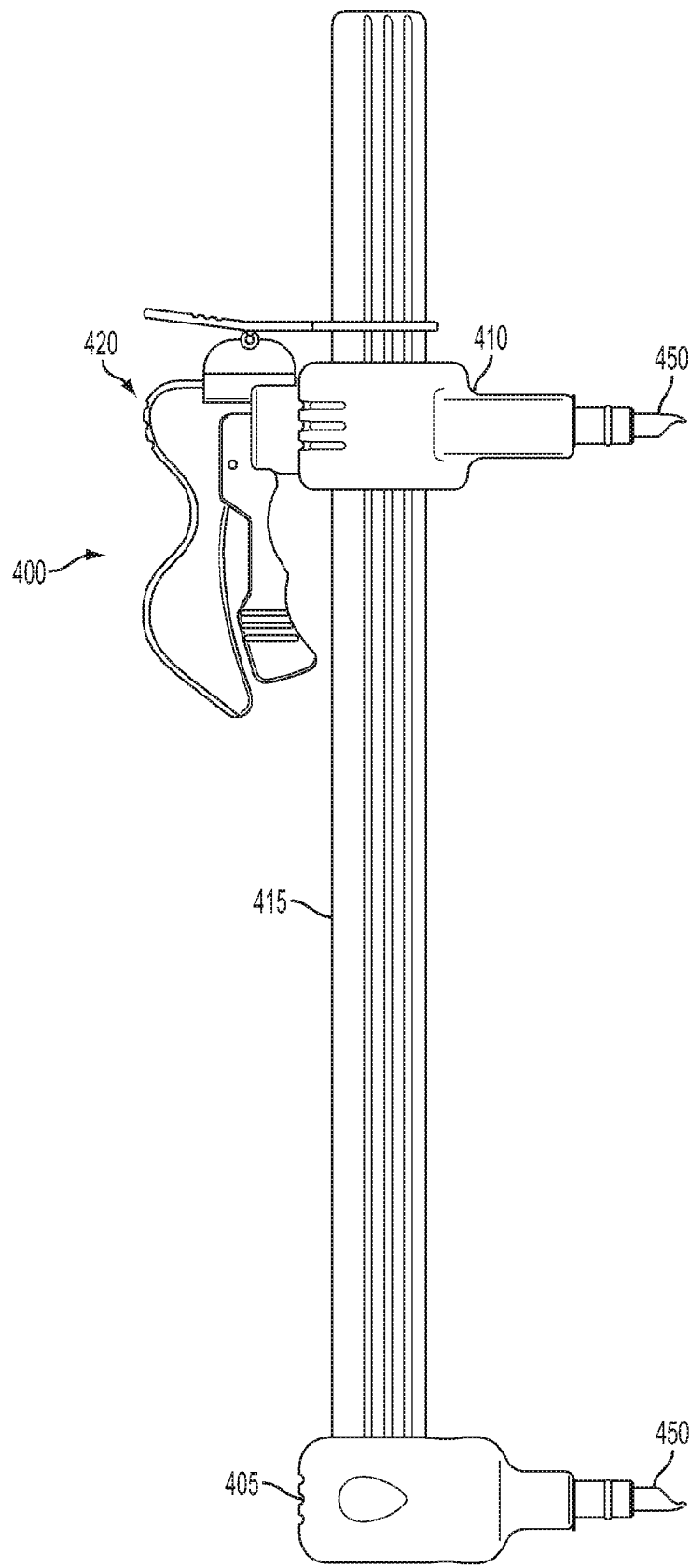
FIGS. 13a-c show a further alternative embodiment of a wheel clamp assembly according to the present disclosure.
Figure 13B:
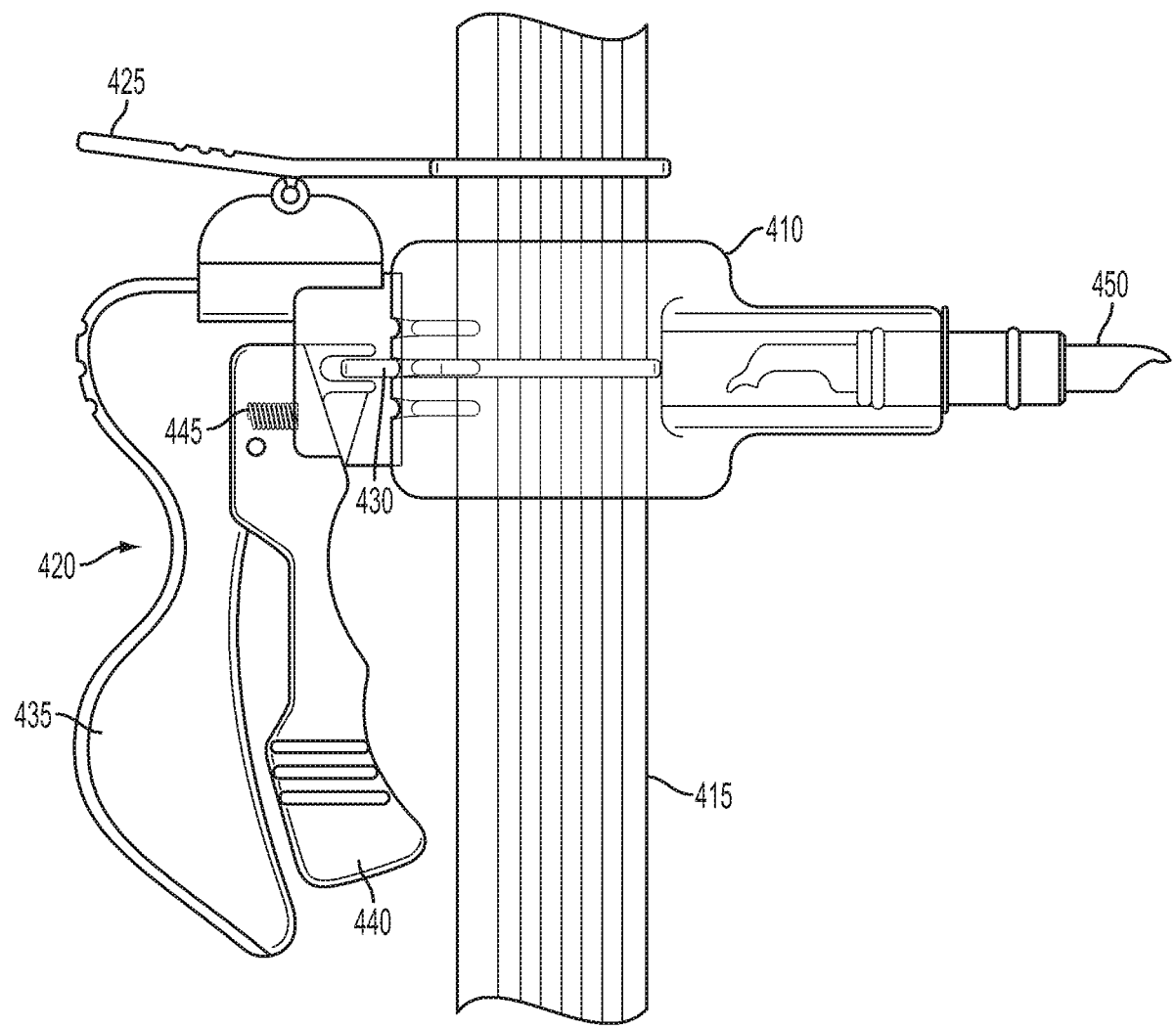
Figure 13C:
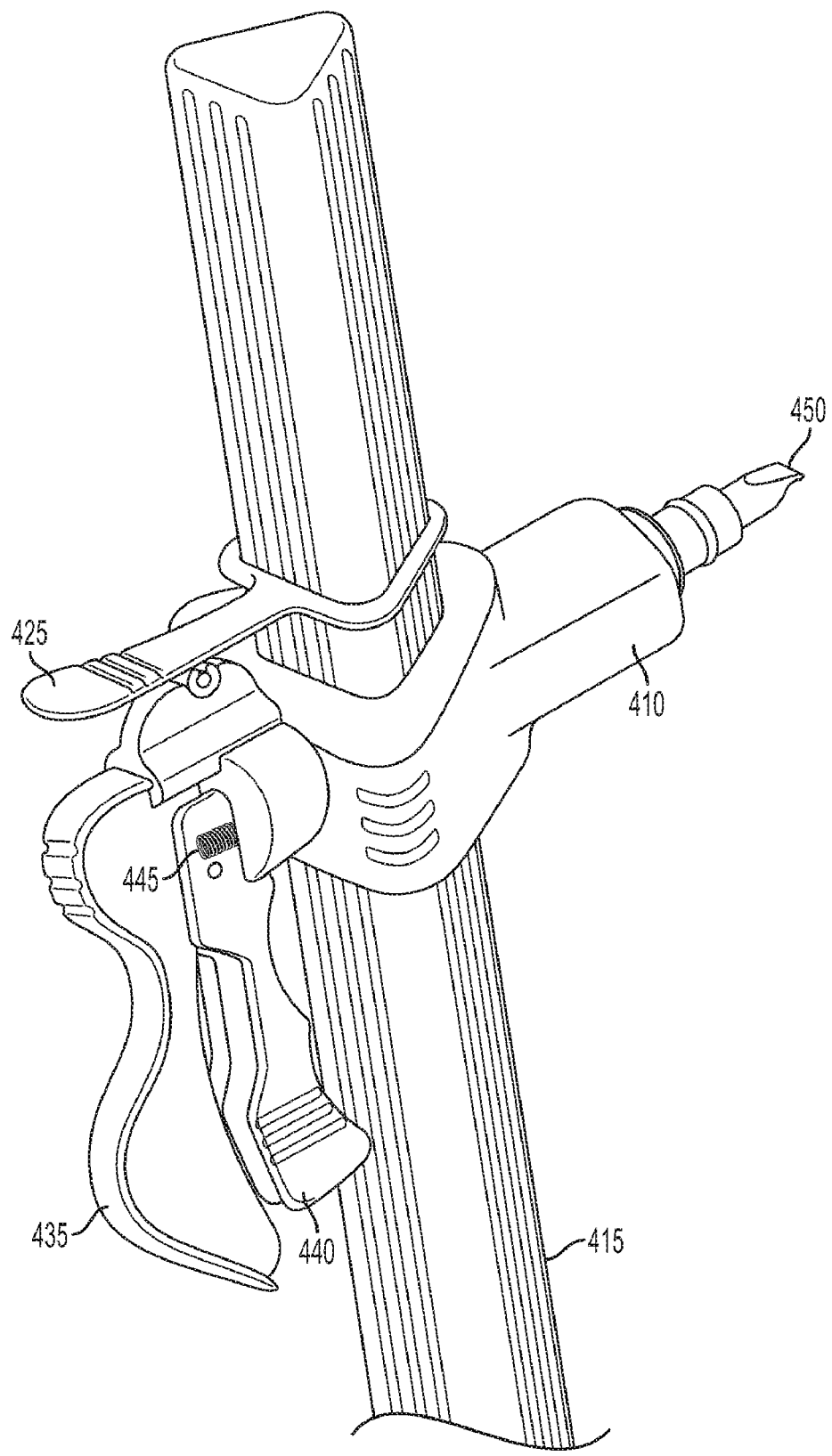

In a still further embodiment of the disclosed wheel clamp assembly, shown in FIGS. 13a-c, a wheel clamp assembly 400 for attaching to a vehicle wheel for performing a wheel alignment on the vehicle includes a first bracket 405 for engaging the vehicle wheel; a second bracket 410 for engaging the vehicle wheel; and a rod 415. The first bracket 405 is fixedly attachable to the rod 415, and the second bracket 410 is slidably movable on the rod 415, and includes a lock 420 for fixedly attaching the second bracket 410 to a selected position on the rod 415 for adjusting a distance between the first and second brackets 405, 410 to rigidly attach the wheel clamp assembly 400 to the vehicle wheel. The rod 415 has at least one flat facet; for example, a substantially triangular cross-section as shown in FIG. 13c, and the second bracket 410 has a corresponding through hole for slidably engaging the rod's outer peripheral facet such that the second bracket 410 does not substantially rotate relative to the rod 415.

Referring now to FIG. 13b, the lock 420 includes a top locking latch 425 which is pivotally attached to the second bracket 410 and surrounds the rod 415, and a ratcheting mechanism that includes an inner locking plate 430 that surrounds the rod 415 and pivots up and down about second bracket 410, an outer handle 435 rigidly attached to the second bracket 410, and an inner handle 440 that pivots about outer handle 435. A spring 445 biases inner handle 440 to a neutral position.

To adjust the clamp assembly, the user presses down on the top locking latch 425 with their thumb, causing the top locking latch 425 to pivot and unlock the ratcheting mechanism. The user then squeezes the inner handle 440, causing the inner locking plate 430 to pivot upwards. Releasing the inner handle 440 causes the second bracket/lock assembly to "climb down" the rod 415, to enable the clamp assembly 400 to be attached to the vehicle wheel. When the clamp assembly 400 is attached to the wheel, the user releases to top locking latch 425 to lock assembly 400 into position. To reverse, the user presses down on the top locking latch 425 and squeezes the inner handle 440 slightly while pulling upwards. Thus, the clamp assembly 400 works similarly to a conventional wood clamp, allowing the second bracket 410 to be moved quickly into position with grabbers 450 on the wheel rim, so the user can then tighten the clamp assembly in place by squeezing the inner handle 440 repeatedly. Certain embodiments of wheel clamp assembly 400 are constructed of structural foam for very light weight.

It will be understood by those of skill in the art that further embodiments of the clamp assembly 400 include features described herein above with reference, e.g., to FIG. 7d, such as measuring device mounting locations 150 on the first and/or second brackets 405, 410 for adjustably mounting a wheel alignment element. Moreover, in further embodiments the second bracket 410 is reversible on rod 415, and is similar in appearance to bracket 115 of FIG. 7d, insofar as it comprises a hub, an arm extending outward from the hub, and a grabber at a distal end of the arm for engaging the vehicle wheel, the arm extending from the hub such that the grabber is offset from the hub along an axial direction of the rod. In this embodiment, the second bracket 410 is engageable with the rod 415 so that the lock 420 is between the first and second brackets 405, 410; and is also engageable with the rod 415 so that the second bracket 410 is between the first bracket 405 and the lock 420.

The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present teachings. However, it should be recognized that the present teachings can be practiced without resorting to the details specifically set forth. In other instances, well known processing structures have not been described in detail, in order not to unnecessarily obscure aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A wheel clamp assembly for attaching to a vehicle wheel for performing a wheel alignment on the vehicle, the assembly comprising:
    a first bracket for engaging the vehicle wheel;
    a second bracket for engaging the vehicle wheel;
    a handle rotatably mounted to the second bracket; and
    a rod having a threaded portion, and an attachment portion proximal a first end of the rod;
    wherein the first bracket is attachable to the attachment portion of the rod; and
    wherein the handle is threadingly engagable with the threaded portion of the rod, such that when a user grasps and rotates the handle, a distance between the first and second brackets can be adjusted to rigidly attach the wheel clamp assembly to the vehicle wheel.

2. The assembly of claim 1, wherein the first bracket is rotatably mounted to the attachment portion of the rod, further comprising a handwheel fixedly mounted at a second end of the rod.

3. The assembly of claim 1, wherein the handle comprises a handle body and a jaw movably mounted to the handle body and threadingly engagable with the threaded portion of the rod;
    wherein the jaw is movable by the user from a first position where it is threadingly engaged with the threaded portion of the rod to a second position where it is not threadingly engaged with the rod; and
    wherein when the jaw is in the first position and the user grasps and rotates the handle body, the distance between the first and second brackets can be adjusted to rigidly attach the wheel clamp assembly to the vehicle wheel, and when the jaw is in the second position, the second bracket and handle are slidably movable relative to the rod.

4. The assembly of claim 3, wherein the first bracket is adjustably mounted to the attachment portion of the rod.

5. The assembly of claim 3, wherein the first bracket is rotatably mounted to the attachment portion of the rod, and a handwheel is fixedly mounted at a second end of the rod so that when the jaw is in the first position and the user rotates the handwheel while preventing the handle from rotating, the distance between the first and second brackets can be adjusted.

6. The assembly of claim 3, wherein the jaw is pivotably mounted to the handle body such that it is pivotable from the first position to the second position by the user, and a spring is mounted between the handle body and the jaw to bias the jaw to the first position.

7. The assembly of claim 3, comprising a second movable jaw opposed to the jaw and mounted to the handle body, the second jaw being threadingly engageable with a corresponding opposed portion of the threaded portion of the rod, wherein the jaw and the second jaw are movable from the first position to the second position.

8. The assembly of claim 7, wherein the second jaw is pivotably mounted to the handle body such that it is pivotable from the first position to the second position by the user, and a spring is mounted between the handle body and the second jaw to bias the second jaw to the first position.

9. The assembly of claim 1, comprising a marking on the second bracket for enabling a camera vision system to find the location of the second bracket.

10. The assembly of claim 1, wherein the first bracket is pivotally attachable to the attachment portion of the rod.

11. The assembly of claim 10, wherein the attachment portion of the rod has a transverse hole, and the first bracket has a corresponding through-hole, and the first bracket is attachable to the attachment portion via a fastener extending through the through-hole and engagable with the transverse hole.

12. The assembly of claim 11, wherein the attachment portion of the rod has a plurality of the transverse holes spaced from each other such that the first bracket is attachable to the rod via any one of the plurality of transverse holes.

13. The assembly of claim 10, further comprising a rod extension having a first end attachable to the attachment portion of the rod to extend the length of the rod, the rod extension having a transverse hole for attaching the first bracket to the rod extension.

14. The assembly of claim 13, wherein the rod extension has a connection portion at a second end opposite its first end for attaching a second rod extension to further extend the length of the rod.

15. The assembly of claim 13, wherein the first end of the rod has a hollow portion, and the rod extension has a connection portion engagable with the hollow portion to attach the rod extension to the rod.

16. The assembly of claim 15, wherein the rod extension has a hollow portion at an end opposite the connection portion for engaging a second rod extension to further extend the length of the rod.

17. The assembly of claim 11, wherein the transverse hole is threaded, and the fastener is a bolt that is threadingly engageable with the transverse threaded hole.

18. The assembly of claim 11, wherein the fastener is a pin having a ball detent for engaging the first bracket to retain the pin in the transverse hole.

19. The assembly of claim 1, wherein the first bracket comprises two grabbers for engaging the vehicle wheel, and the second bracket comprises exactly one grabber for engaging the vehicle wheel, wherein the grabbers of the first and second brackets cooperate to rigidly attach the wheel clamp assembly to the vehicle wheel when the distance between the first and second brackets is adjusted.

20. The assembly of claim 1, wherein the first bracket comprises at least one grabber for engaging the vehicle wheel;
wherein the second bracket comprises a central hub and a pair of arms pivotally mounted to the hub, each of the arms having a grabber for engaging the vehicle wheel, and a spring for biasing the arms towards each other, such that when the distance between the first and second brackets is adjusted so the grabbers of the first and second brackets engage the vehicle wheel, the second bracket arms move away from each other as the distance between the first and second brackets is thereafter reduced, until the wheel clamp assembly is rigidly attached to the vehicle wheel.

21. The assembly of claim 20, wherein the pair of arms share a common pivot point on the hub, and the spring is a coil spring attached to both arms.

22. The assembly of claim 1, wherein the second bracket comprises a hub, an arm extending outward from the hub, and a grabber at a distal end of the arm for engaging the vehicle wheel, the arm extending from the hub such that the grabber is offset from the hub along an axial direction of the rod;
wherein the second bracket and the handle are threadable onto the rod so that the handle is between the first and second brackets; and
wherein the second bracket and the handle are threadable onto the rod so that the second bracket is between the first bracket and the handle.

23. The assembly of claim 1, wherein the rod has an outer peripheral facet, and the second bracket has a corresponding through-hole for slidably engaging the rod's outer peripheral facet such that when the when user grasps and rotates the handle to adjust the distance between the first and second brackets, the second bracket does not substantially rotate relative to the rod.

24. The assembly of claim 6, wherein the jaw and the spring are for moving the jaw from the first position to the second position when a predetermined tension is exerted on the threaded portion of the rod when user grasps and rotates the handle.

25. The assembly of claim 1, wherein the first bracket has a measuring device mounting location for adjustably mounting a wheel alignment element to the first bracket.

26. The assembly of claim 1, wherein the second bracket has a measuring device mounting location for adjustably mounting a wheel alignment element to the second bracket.

27. A wheel clamp assembly for attaching to a vehicle wheel for performing a wheel alignment on the vehicle, the assembly comprising:
a first bracket for engaging the vehicle wheel;
a second bracket for engaging the vehicle wheel;
a handle mounted to the second bracket;
a threaded shaft having a first threaded portion threaded in a first direction, and a second threaded portion threaded in a second direction opposite the first direction; and
a handwheel fixedly attached to an end of the shaft;
wherein the first bracket is threadingly engaged with the first threaded portion of the shaft, and the handle is threadingly engaged with the second threaded portion of the shaft, such that when a user rotates the handwheel while preventing the handle from rotating, a distance between the first and second brackets can be adjusted to rigidly attach the wheel clamp assembly to the vehicle wheel.

28. The assembly of claim 27, comprising a marking on the second bracket for enabling a camera vision system to find the location of the second bracket.

29. The assembly of claim 27, wherein the handle comprises a handle body and a jaw movably mounted to the handle body and threadingly engagable with the second threaded portion of the shaft;
wherein the jaw is movable by the user from a first position where it is threadingly engaged with the second threaded portion to a second position where it is not threadingly engaged with the shaft; and
wherein when the jaw is in the first position and a user rotates the handwheel while preventing the handle from rotating, the distance between the first and second brackets can be adjusted to rigidly attach the wheel clamp assembly to the vehicle wheel, and when the jaw is in the second position, the second bracket and handle are slidably movable relative to the rod.

30. The assembly of claim 29, wherein the jaw is pivotably mounted to the handle body such that it is pivotable from the first position to the second position by the user, and a spring is mounted between the handle body and the jaw to bias the jaw to the first position.

31. The assembly of claim 29, comprising a second movable jaw opposed to the jaw and mounted to the handle body, the second jaw being threadingly engageable with a corresponding opposed portion of the second threaded portion of the shaft, wherein the jaw and the second jaw are movable from the first position to the second position.

32. The assembly of claim 31, wherein the second jaw is pivotably mounted to the handle body such that it is pivotable from the first position to the second position by the user, and a spring is mounted between the handle body and the second jaw to bias the second jaw to the first position.

33. The assembly of claim 30, wherein the jaw and the spring are for moving the jaw from the first position to the second position when a predetermined tension is exerted on the threaded portion of the rod when user grasps and rotates the handle.

34. The assembly of claim 27, wherein the first bracket has a measuring device mounting location for adjustably mounting a wheel alignment element to the first bracket.

35. The assembly of claim 27, wherein the second bracket has a measuring device mounting location for adjustably mounting a wheel alignment element to the second bracket.

36. The assembly of claim 27, wherein the handle is rotatably mounted to the second bracket.

37. A wheel clamp assembly for attaching to a vehicle wheel for performing a wheel alignment on the vehicle, the assembly comprising:
   a first bracket for engaging the vehicle wheel;
   a second bracket for engaging the vehicle wheel; and
   a rod;
   wherein the first bracket is fixedly attachable to the rod; and
   wherein the second bracket is slidably movable on the rod, and includes a lock for fixedly attaching the second bracket to a selected position on the rod for adjusting a distance between the first and second brackets to rigidly attach the wheel clamp assembly to the vehicle wheel.

38. The assembly of claim 37, wherein the first bracket has a measuring device mounting location for adjustably mounting a wheel alignment element to the first bracket.

39. The assembly of claim 38, wherein the second bracket has a measuring device mounting location for adjustably mounting a wheel alignment element to the second bracket.

40. The assembly of claim 37, wherein the lock comprises a lever pivotably mounted to the second bracket and engageable with the rod.

41. The assembly of claim 37, wherein the rod has an outer peripheral facet, and the second bracket has a corresponding through-hole for slidably engaging the rod's outer peripheral facet such that the second bracket does not substantially rotate relative to the rod.

42. The assembly of claim 41, wherein the rod has at least one flat facet.

43. The assembly of claim 42, wherein the rod has a substantially triangular cross-section.

44. The assembly of claim 37, wherein the second bracket comprises a hub, an arm extending outward from the hub, and a grabber at a distal end of the arm for engaging the vehicle wheel, the arm extending from the hub such that the grabber is offset from the hub along an axial direction of the rod;
   wherein the second bracket is engageable with the rod so that the lock is between the first and second brackets; and
   wherein the second bracket is engageable with the rod so that the second bracket is between the first bracket and the lock.

45. A wheel clamp assembly for attaching to a vehicle wheel for performing a wheel alignment on the vehicle, the assembly comprising:
   a first bracket for engaging the vehicle wheel;
   a second bracket for engaging the vehicle wheel;
   a handle mounted to the second bracket;
   a shaft having a threaded portion; and
   a handwheel fixedly attached to an end of the shaft;
   wherein the first bracket is threaded in a first direction and is threadingly engaged with the threaded portion of the shaft, and the handle is threaded in a second direction opposite the first direction and is threadingly engaged with the threaded portion of the shaft, such that when a user rotates the handwheel while preventing the handle from rotating, a distance between the first and second brackets can be adjusted to rigidly attach the wheel clamp assembly to the vehicle wheel.

\* \* \* \* \*